US010805788B2

(12) United States Patent
Burgert et al.

(10) Patent No.: US 10,805,788 B2
(45) Date of Patent: Oct. 13, 2020

(54) SYSTEM AND METHOD FOR SETTING UP A CALL TO A ROAMING PARTY THROUGH AN OVER-THE-TOP (OTT) CALL SERVICE

(71) Applicant: Tata Communications (America) Inc., Herndon, VA (US)

(72) Inventors: Kenneth Burgert, Old Bridge, NJ (US); Alan Tai, Marlboro, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

(21) Appl. No.: 15/579,540

(22) PCT Filed: May 27, 2016

(86) PCT No.: PCT/US2016/034588
§ 371 (c)(1),
(2) Date: Dec. 4, 2017

(87) PCT Pub. No.: WO2016/196266
PCT Pub. Date: Dec. 8, 2016

(65) Prior Publication Data
US 2018/0160291 A1     Jun. 7, 2018

Related U.S. Application Data

(60) Provisional application No. 62/171,084, filed on Jun. 4, 2015.

(51) Int. Cl.
*H04W 8/12* (2009.01)
*H04W 8/06* (2009.01)
(Continued)

(52) U.S. Cl.
CPC .............. *H04W 8/12* (2013.01); *H04W 8/06* (2013.01); *H04W 8/18* (2013.01); *H04L 12/66* (2013.01); *H04M 3/42* (2013.01)

(58) Field of Classification Search
CPC ............ H04W 8/12; H04W 8/18; H04W 8/06
See application file for complete search history.

(56) References Cited

U.S. PATENT DOCUMENTS 8,874,120 B1 * 10/2014 Tian ....................... H04W 8/12
                                                           455/445
9,042,902 B1    5/2015 Patel
(Continued)

FOREIGN PATENT DOCUMENTS

GB         2379135 A      2/2003
GB         2489027 A      9/2012
(Continued)

OTHER PUBLICATIONS

Officer: Finnie Alistair, "International Search Report and Written Opinion" dated Aug. 18, 2016 issued in counterpart International Patent Application No. PCT/US2016/034588, Publisher: PCT.

*Primary Examiner* — Redentor Pasia
(74) *Attorney, Agent, or Firm* — Kaplan Breyer Schwarz, LLP (57) ABSTRACT

A system and method that enables the setting up of an incoming call from an originating endpoint of a calling party to a mobile station of a called party who is registered as a roamer in a visited cellular network. In response to receiving a dialed number, or other call information, the system determines whether to set up the call to the mobile station of the called party through a pre determined, over-the-top (OTT) call service that bypasses the visited network. The OTT call service is offerable as a feature to the called party by the party's home mobile network operator (MNO). Call handling for the OTT call service is provided through i) an OTT feature server that is coordinating the incoming call, an application server that is affiliated with the OTT feature
(Continued)

server, and iii) a OTT software application that is executing on the called party's mobile station.

19 Claims, 9 Drawing Sheets

(51) Int. Cl.
*H04W 8/18* (2009.01)
*H04L 12/66* (2006.01)
*H04M 3/42* (2006.01)

(56) References Cited

U.S. PATENT DOCUMENTS

| | | | | |
|---|---|---|---|---|
| 9,538,574 B2* | 1/2017 | Keller | | H04W 76/18 |
| 2009/0129371 A1* | 5/2009 | Bishay | | H04M 7/123 |
| | | | | 370/352 |
| 2010/0004006 A1* | 1/2010 | Guo | | H04W 4/16 |
| | | | | 455/466 |
| 2013/0165076 A1* | 6/2013 | Muratore | | H04W 4/06 |
| | | | | 455/411 |
| 2013/0288671 A1* | 10/2013 | Keller | | H04W 76/18 |
| | | | | 455/433 |
| 2015/0230087 A1* | 8/2015 | Barkan | | H04L 63/0876 |
| | | | | 455/411 |
| 2016/0066365 A1* | 3/2016 | Najafabadi | | H04W 40/248 |
| | | | | 455/432.3 |
| 2016/0345370 A1* | 11/2016 | Noldus | | H04W 8/08 |
| 2016/0381657 A1* | 12/2016 | Blanchard | | H04W 84/042 |
| | | | | 455/427 |

FOREIGN PATENT DOCUMENTS

| | | | |
|---|---|---|---|
| WO | 2014029409 A1 | | 8/2012 |
| WO | 2015069160 A1 | | 5/2015 |
| WO | WO 2015/069160 | * | 5/2015 |

* cited by examiner

SYSTEM AND METHOD FOR SETTING UP A CALL TO A ROAMING PARTY THROUGH AN OVER-THE-TOP (OTT) CALL SERVICE

CROSS REFERENCE TO RELATED APPLICATIONS

The following document is incorporated by reference herein: U.S. Provisional Application Ser. No. 62/171,084, filed Jun. 4, 2015. If there are any contradictions or inconsistencies in language between this application and the document that has been incorporated by reference that might affect the interpretation of the claims in this application, the claims in this application should be interpreted to be consistent with the language in this application.

FIELD OF THE INVENTION

The present invention relates to telecommunications in general, and, more particularly, to setting up a call from an originating endpoint of a calling party to a mobile station of a called, roaming party through an over-the-top (OTT) call service.

BACKGROUND OF THE INVENTION

Figure 1:
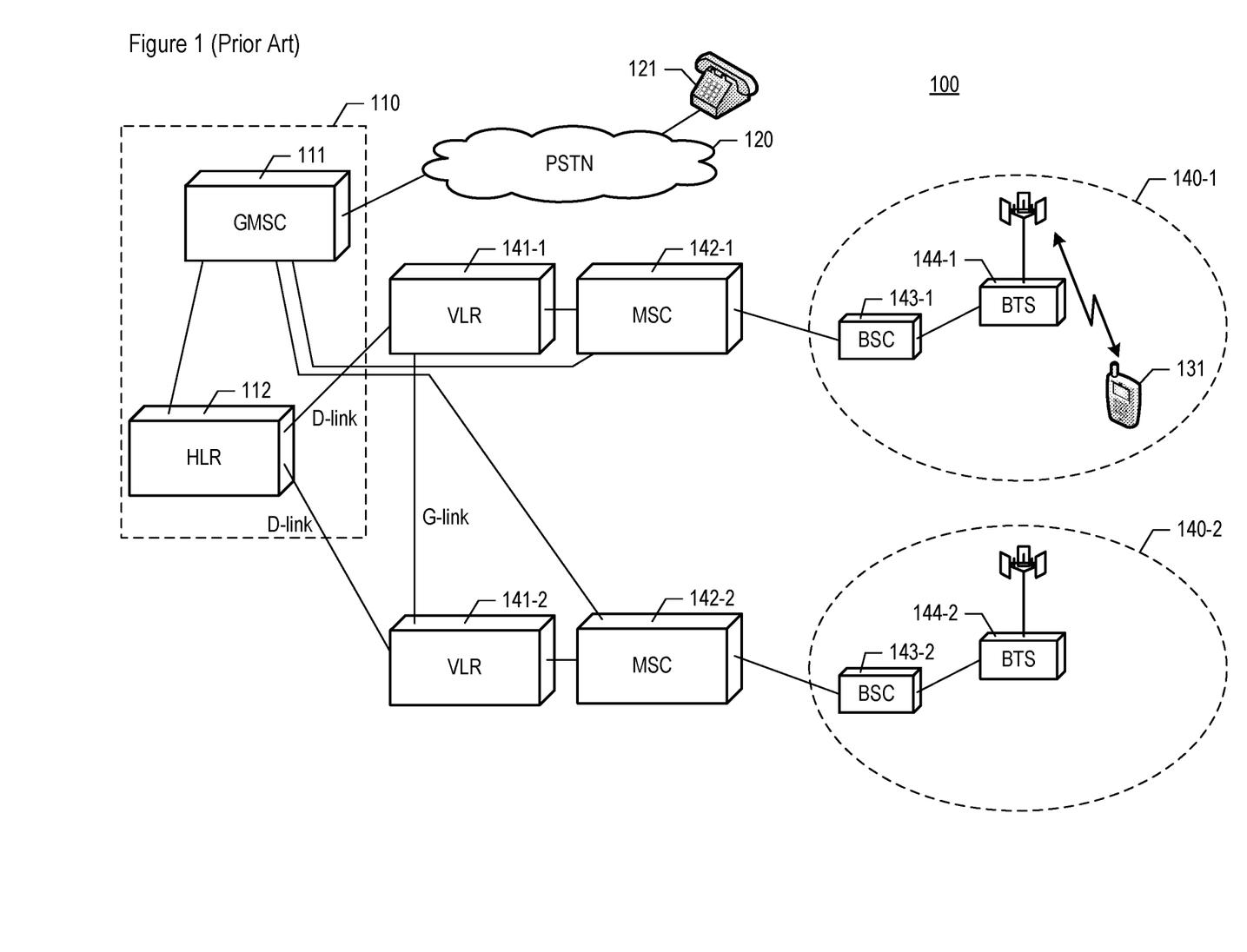
FIG. 1 depicts a diagram of the salient components of wireless telecommunications system 100 in the prior art.

FIG. 1 depicts a diagram of the salient components of wireless telecommunications system 100 in the prior art. Wireless telecommunications system 100 comprises the depicted data-processing systems, which are interrelated as shown. The equipment that constitutes system 100 includes service-control equipment, switching equipment, and radio access equipment, and is described in detail below. Wireless telecommunications system 100 provides wireless telecommunications service to mobile station (MS) 131 when present in any of location areas 140-i, for i=1 through I, wherein I is a positive integer and whose value equals two as depicted. System 100 provides service in accordance with the Global System for Mobile Communications (GSM) set of standards, in which the concept of location areas is defined.

Some of the equipment components that are present in system 100 are not associated with a specific location area 140-i. Such equipment include components include i) gateway mobile switching center (GMSC) 111 and ii) home location register (HLR) 112, both of which are associated with mobile network operator (MNO) network 110 as depicted, and iii) public-switched telephone network (PSTN) 120 that provides telecommunications service to telephone 121. Mobile station 131 is not fixed to a particular location area, but can move into and be associated with any location area 140-i, depending on its present location. As depicted in FIG. 1, mobile station 131 is presently associated with location area 140-1.

Gateway mobile switching center (GMSC) 111 serves as a gateway between two types of networks, in this case PSTN 120 and the MNO portion of system 100 that serves the depicted location areas.

Home location register (HLR) 112 comprises equipment for storing a central database that contains details of each mobile station subscriber who is authorized to use one or more location areas as the subscriber's home network. HLR 112 stores details of every subscriber identity module (SIM) card issued by an MNO. A SIM card comprises an integrated circuit and is used in mobile station 131. Each SIM has a unique identifier called an "international mobile subscriber identity," or "IMSI." An IMSI is a primary key to each HLR record. Another identifier that is associated with the SIM is a "MSISDN," which is often referred to as a "mobile station international subscriber directory number." Each MSISDN is also a primary key to the HLR record of a subscriber. The MSISDN is the number normally dialed by a calling party to place a call to a mobile station.

The MSISDN together with the IMSI are two important numbers used for identifying a mobile subscriber. The IMSI identifies the SIM, and the MSISDN is used for routing calls to the subscriber. The HLR data for a subscriber is stored for as long as a subscriber continues to subscribe to the service provided by the MNO network associated with HLR 112, in this case MNO network 110.

Some subscribers who are receiving wireless services within location area 140-1 or 140-2 are present within their home service area. Information about these subscribers, and their SIMs and mobile stations, are stored within an HLR serving those subscribers, which HLR is not depicted in FIG. 1 and different from HLR 112 that is serving subscribers whose home network is network 110. Other subscribers within location area 140-1 or 140-2, however, are not present within their home service area. Instead, they are considered "roamers" within a service area that is operated by an MNO that is different than their home service provider.

In contrast with the components described above, some of the other equipment components that are present in system 100 are, in fact, associated with one or more specific location areas, such as location area 140-i. Such equipment components include visitor location register (VLR) 141-i, mobile switching center (MSC) 142-i, base station controller (BSC) 143-i, and base transceiver station (BTS) 144-i.

Visitor location register (VLR) 141-i comprises equipment for storing a database of GSM network subscribers who have roamed into the serving area of MSC 142-i, within a location area. In other words, VLR 141-i serves MSC 142-i. The data stored in VLR 141-i is either received from HLR 112 or collected from mobile station 131, or both. VLRs 141-1 and 141-2 communicate with HLR 112 via "D" interfaces, communicate with each other via a "G" interface, and communicate with MSCs 142-1 and 142-2, respectively, via "B" interfaces. In some configurations, VLR 141-i is integrated with MSC 142-i.

Mobile switching center (MSC) 142-i provides at least some of the switching capability across location area 140-i. MSC 142-i comprises a switch that orchestrates the provisioning and control of telecommunications service to the mobile stations. System 100 includes a plurality of MSCs, each being responsible for a geographic region of the network, in this case a particular location area. MSC 142-i is connected to one or more BSCs (described below), and it can interface with other MSCs.

MSC 142-i also enables a subscriber of system 100 to place a call to, or receive a call from, another network such as Public Switched Telephone Network (PSTN) 120 or other wireless networks.

Base transceiver station (BTS) 144-i is mobile station 131's access point to system 100. The BTS performs speech encoding, encryption, and other functions. Communications between mobile station 131 and a BTS 144-i occur over an air interface. These communications, which include control signaling as well as voice, data and Short Message Service (SMS) traffic, are carried over designated channels via known methods. System 100 can include a different number of BTSs than that depicted.

Base station controller (BSC) 143-i controls one or more BTSs. For example, the BSC handles radio channel allocation, frequency administration, receives power and signal measurements originating from the mobile stations, and controls handovers between BTSs that are connected to the same BSC. As depicted in FIG. 1, BSC 143-*i* controls BTS 144-*i*. Although BSC 143-*i* is depicted as being geographically remote from BTS 144-*i*, it can be co-located with a BTS or with mobile switching center 142. System 100 can include multiple BSCs, even within a given location area 140-*i*.

Regardless of whether a subscriber is in his home area or in a roaming area, the VLR that is currently serving the subscriber and the subscriber's own HLR continually exchange data with each other. This exchange of data is important, not only to provide communication services to the subscriber and associated mobile station, but also to keep track of and provide only those services that are allowed for each subscriber and mobile station. For example, a subscriber might be allowed to use one set of services in his home area, but a different set of services while roaming in a different area. The services allowed in the roaming area are typically a subset of the services allowed in the subscriber's home area.

In cellular telecommunications, roaming charges are typically incurred whenever a cellular subscriber travels outside of her mobile carrier's home network and while in a visited network. For example, if a U.S. service provider's subscriber "A" in the United States travels to the United Kingdom, mobile station 131 of subscriber A is in a roaming mode in which it registers with a local U.K. service provider. If someone calls subscriber A's mobile number, the call first routes into the home network of subscriber A—i.e., network 110, which is that of the U.S. provider—and then redirects to the network of the U.K. provider, in order to reach roaming mobile station 131 in visited location area 140-1. Consequently, there is a roaming charge that has to be paid to the U.K. service provider, either by the home U.S. service provider or by the subscriber herself.

SUMMARY OF THE INVENTION

The present invention enables the setting up of an incoming call from an originating endpoint of a calling party to a mobile station of a called party who is registered as a roamer in a visited cellular network. In response to receiving a dialed number, or other call information, the system of the illustrative embodiment determines whether to set up the call to the mobile station of the called party through a predetermined, over-the-top (OTT) call service that bypasses the visited cellular network. The OTT call service is offerable as a feature to the called party by the party's home mobile network operator (MNO) and can be subscribed to by the called party.

In accordance with the illustrative embodiment of the present invention, call handling for the OTT call service is provided through i) an OTT feature server that is coordinating the incoming call, a visitor location register (VLR) application server that is affiliated with the OTT feature server, and iii) a OTT software application that is executing on the called party's mobile station. Through a prior arrangement with the home MNO, the VLR application server is permitted by the cooperative home MNO to supersede the VLR of the visited cellular network, by providing the home location register (HLR) of the home MNO network with information for setting up a call to the mobile station via the OTT call service. The VLR application server of the illustrative embodiment interacts with the HLR, which in turn interacts as needed with the VLR of visited cellular network with which the mobile station is registered, such that the visited cellular network remains unaware of an incoming call being redirected for delivery through the OTT service.

Based on the aforementioned interactions and on other criteria discussed herein, the system of the illustrative embodiment determines a roaming number that corresponds to a point that is external to the visited cellular network, wherein the call can be set up and routed through an alternative path than that of the visited MNO network with which the mobile station has registered, based on the roaming number determined. The alternative path can comprise, for example, a conditioned Internet protocol (IP) network and a wireless access point in a computer network (e.g., WiFi, etc.). The roaming number can be determined based on the geographic location of the mobile station.

In providing such an alternative path, the call handling technique of the illustrative embodiment offers a technical improvement by reducing or eliminating roaming charges that would otherwise be owed to the visited MNO. The disclosed call handing technique can also be used to offload a congested cellular network that would otherwise be used to handle the incoming call to the called party registered with that network, by redirecting the call through the alternative path. Additionally, in providing an alternative path through a conditioned, optimized IP network, the quality of the call can be maintained at a predetermined level. As another advantage over some techniques in the prior art, the subscriber is not required to set up call forwarding to a different number than that of her mobile station when enabling calls through the OTT call service.

An illustrative system for setting up a call from an originating endpoint of a calling party to a mobile station of a called party comprising a first computer system, comprises: a receiver that is configured to receive, from a second computer system, a dialed number for the call when placed by the calling party, wherein the dialed number corresponds to the mobile station; a processor that is configured to determine a roaming number based on a geographic location of the mobile station, wherein the roaming number corresponds to a point that is external to a cellular network with which the mobile station is registered; and a transmitter that is configured to transmit, to the second computer system, a message containing the roaming number by which the second computer system routes the call.

An illustrative method for setting up a call from an originating endpoint of a calling party to a mobile station of a called party, comprises: receiving, by a first computer system from a second computer system, a dialed number for the call when placed by the calling party, wherein the dialed number corresponds to the mobile station; determining, by the first computer system, a roaming number based on a geographic location of the mobile station, wherein the roaming number corresponds to a point that is external to a cellular network with which the mobile station is registered; and transmitting, by the first computer system to the second computer system, a message containing the roaming number by which the second computer system routes the call.

An illustrative non-transitory computer-readable medium storing a computer program comprises computer-readable instructions that, when loaded and executed on a computer system, cause the computer system to perform the steps of a method according to any one of the preceding claims.

DETAILED DESCRIPTION

For the purposes of this specification, the following terms and their inflected forms are defined as follows:

The term "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

The term "location" is defined as a zero-dimensional point, a finite one-dimensional path segment, a finite two-dimensional surface area, or a finite three-dimensional volume.

The term "location area" is a geographic region within which wireless telecommunication service is provided to subscribers via a non-empty set of base stations and other associated equipment, such as a serving mobile switching center (MSC) and a serving visitor location register (VLR). One or more location areas can be associated with a corresponding MSC and VLR.

The term "mobile station" is defined as a wireless telecommunications terminal that is capable of transmitting and/or receiving communications wirelessly. As is well known to those skilled in the art, a mobile station is also commonly referred to by a variety of alternative names such as a wireless transmit/receive unit (WTRU), a user equipment (UE), a wireless terminal, a fixed or mobile subscriber unit, a pager, a cellular telephone, a smartphone, a personal digital assistant (PDA), a computer, or any other type of device capable of operating in a wireless environment.

The term "mobile network operator" (MNO) is defined as a provider of wireless communications services that owns or controls, or both, all of the elements necessary to sell and deliver services to an end user including radio spectrum allocation, wireless network infrastructure, back haul infrastructure, billing, customer care, provisioning computer systems and marketing and repair organizations. An MNO is also known as a wireless service provider, wireless carrier, cellular company, or mobile network carrier, The terms used to describe elements of a wireless telecommunications network are given their industry-established meanings, unless otherwise indicated. These terms include: mobile switching center, base station controller, base transceiver station, gateway mobile switching center, home location register, visitor location register, Abis link, A-link, B-link, D-link, G-link, and subscriber data.

Figure 2:
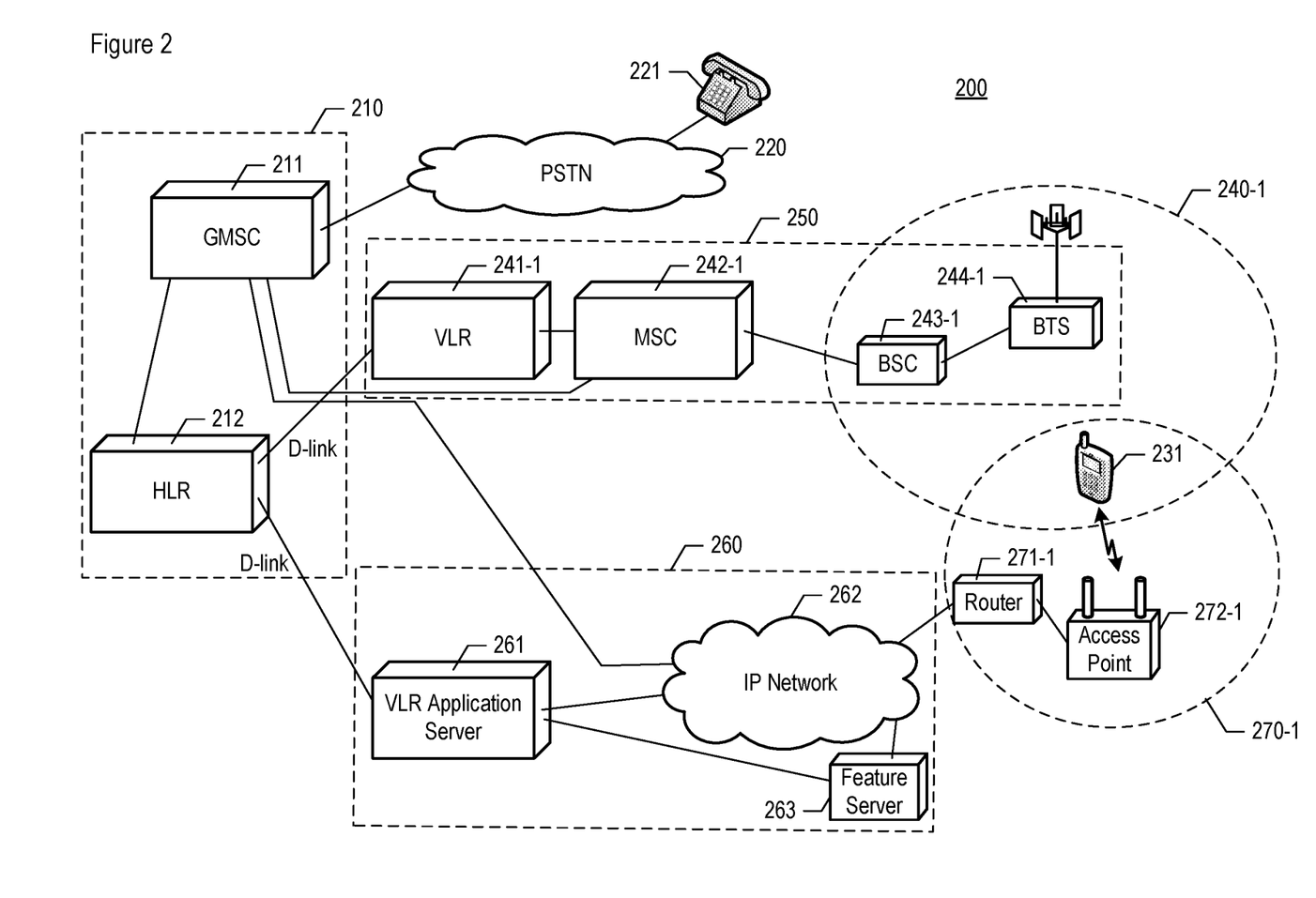
FIG. 2 depicts a diagram of the salient components of wireless telecommunications system 200, in accordance with the illustrative embodiment of the present invention.

The following abbreviations are used in this specification:
GSM Global System for Mobile Communications
MS Mobile Station
BTS Base Transceiver Station
BSC Base Station Controller
MSC Mobile Switching Center
GMSC Gateway Mobile Switching Center
HLR Home Location Register
VLR Visitor Location Register
MAP Mobile Application Part
SIP Session Initiation Protocol
SS7 Signaling System No. 7
TDM Time-Division Multiplexing
MNO Mobile Network Operator
OTT Over-The-Top
PSTN Public Switched Telephone Network
MSISDN Mobile Station International Subscriber Directory Number
MSRN Mobile Subscriber Roaming Number
IMSI International Mobile Subscriber Identity
TMSI Temporary Mobile Subscriber Identity
SIM Subscriber Identity Module FIG. 2 depicts a diagram of the salient components of wireless telecommunications system 200, in accordance with the illustrative embodiment of the present invention. Wireless telecommunications system 200 comprises the depicted data-processing systems, which are interrelated as shown. The equipment that constitutes system 200 includes service-control equipment, switching equipment, and radio access equipment, and is described in detail below.

The illustrative embodiment provides cellular telecommunications service to mobile station (MS) 231 when present in any of location areas 240-*i*, for i=1 through I, wherein I is a positive integer and whose value equals one as depicted. Furthermore, the illustrative embodiment provides wireless telecommunications service to mobile station (MS) 231, in accordance with a predetermined over-the-top (OTT) call service, when MS 231 is present in any of hotspots 270-*j*, for j=1 through J, wherein J is a positive integer and whose value equals one as depicted.

System 200 enables the call termination of calls (e.g., voice calls, video calls, data calls, etc.), which can include "sessions," to mobile station 231 that are originated from PSTN 220, including calls originated from telephone 221, or from a different telecommunications network. "Call termination" refers to the routing of telephone calls from one telephone company, also known as a carrier or provider, to another. The terminating point is the "called party" or "end point." The "originating endpoint" is that the calling party who initiates the call, such as telephone 221. The "terminating endpoint" is that of the called party who receives the call, such as mobile station 231. "Terminating" a call is different than "ending" or "releasing" a call.

Wireless telecommunications system 200 comprises equipment within a first and a second mobile network operator (MNO) network—namely, MNO networks 210 and 250. The geographic regions covered by each MNO's network can be geographically distinct. For pedagogical purposes, the first service provider's network is situated in New York City, while the second service provider's network is situated in London. As those who are skilled in the art will appreciate after reading this specification, however, the two cellular networks can be situated in other places. In some embodiments of the present invention, MNO networks 210 and 250, as well as the respective equipment components therein, are controlled by different business entities, while in some other embodiments the two networks are controlled by the same business entity. Meanwhile, PSTN 220 can be associated with a separate telecommunications provider entirely.

MNO networks 210 and 250 are described in this specification as being cellular networks providing cellular service. Although discussed within the context of a cellular network, in some embodiments MNO network 210 and/or 250 can be another type of network in which the MNO owns and/or controls access to a radio spectrum license from a regulatory or government entity that is different from cellular spectrum.

Some of the equipment components that are present in system 200 are not associated with a specific location area 240-$i$, but nevertheless support the concept of location areas. Such equipment include components include i) gateway mobile switching center (GMSC) 211 and ii) home location register (HLR) 212, both of which provide telecommunications service for mobile network operator (MNO) network 210, and iii) public-switched telephone network (PSTN) 220 that provides telecommunications service to telephone 221. GMSC 211, HLR 212, and PSTN 220, and telephone 221 are analogous to GMSC 111, HLR 112, and PSTN 120, and telephone 121, respectively.

In contrast with the components described above, some of the other equipment components that are present in system 200 are, in fact, associated with one or more specific location areas, such as location area 240-$i$. Such equipment components include visitor location register (VLR) 241-$i$, mobile switching center (MSC) 242-$i$, base station controller (BSC) 243-$i$, and base transceiver station (BTS) 244-$i$. Respectively, these equipment components are analogous to VLR 141-$i$, MSC 142-$i$, BSC 143-$i$, and BTS 144-$i$.

In accordance with the illustrative embodiment, cellular telecommunications service is provided to mobile station 231, when present in location area 240-$i$, according to the Global System for Mobile Communications (GSM) set of standards. After reading this disclosure, however, it will be clear to those skilled in the art how to make and use alternative embodiments of the present invention that operate in accordance with one or more other cellular air-interface standards (e.g., Universal Mobile Telecommunications System "UMTS", Long Term Evolution "LTE", CDMA-2000, IS-136 TDMA, IS-95 CDMA, 3G Wideband CDMA, etc.).

The elements of a GSM network have been previously described in this specification and are well known to those skilled in the art. To the extent that such elements are described further in this specification, it is primarily for the purposes of establishing or describing their relationship with respect to elements that are germane to embodiments of the present invention.

Mobile station 231 comprises the hardware and software necessary to communicate wirelessly with network infrastructure, including a subscriber identity module (SIM) configured to store the subscriber's telephone number (e.g., MSISDN, etc.) and IMSI. MS 231 further comprises the hardware and software necessary to perform the related processes described below and in the accompanying figures. For example and without limitation, mobile station 231 is capable of:

i. receiving an incoming (i.e., "mobile-terminated") voice call or other communication (e.g., SMS text, data, etc.),
ii. transmitting an outgoing (i.e., "mobile-originated") voice call or other communication (e.g., SMS text, data, etc.), and
iii. receiving, transmitting, or otherwise processing one or more signals in support of capabilities i and ii.

Mobile station 231 comprises the hardware and software necessary to be GSM-compliant and to perform the related processes described below and in the accompanying figures. After reading this disclosure, however, it will be clear to those skilled in the art how to make and use alternative embodiments of the present invention in which MS 231 operates in accordance with one or more other cellular air-interface standards, as already enumerated.

Mobile station 231 further comprises the hardware and software necessary to be WiFi-compliant and to perform the related processes described below and in the accompanying figures. After reading this disclosure, it will be clear to those skilled in the art how to make and use alternative embodiments of the present invention that operate in accordance with one or more other computer network standards (e.g., IEEE 802.16 WiMax, Bluetooth, LoRa, etc.) in one or more frequency bands, including, but not limited to, personal area network (PAN) standards and local area network (LAN) standards.

Mobile station 231 can move into and be associated with any location area 240-$i$, depending on its present location. MS 231 can also move into and be associated with any WiFi hotspot 270-$j$, depending on its present location. As depicted in FIG. 2, mobile station 231 is presently associated with WiFi hotspot 270-1, even though it is also within the coverage area that corresponds to area 240-1.

Mobile station 231 is capable of executing an over-the-top (OTT) application, or "app", pre-programmed with awareness of the mobile network operator of network 210. The OTT app enables the mobile station, and thus its user, to access the corresponding OTT call service as a called party in a given call or as a calling party, for that matter.

By processing a call via the OTT app of the illustrative embodiment, MS 231 uses a computer network (e.g., LAN, PAN, etc.) to access the Internet, such as the computer network accessible via hotspot 270-1, in order to access the corresponding OTT call service to complete the call. This is, in contrast, to the mobile station relying directly on a cellular network itself, such as cellular network 250 accessible in location area 240-1, to handle at least some of the call control and switching of the call. In fact, MS 231 is capable of communication via a radio channel within a cellular network concurrently with the mobile station being attached to a wireless computer network.

Although wireless telecommunications system 231 as depicted comprises only one mobile station, it will be clear to those skilled in the art, after reading this disclosure, how to make and use alternative embodiments of the present invention that comprise any number of mobile stations.

In addition to the equipment components described thus far, some of the other equipment components that are present in system 200 are agnostic to any GSM location area. Such equipment components include VLR application server 261, Internet protocol network 262, router 271-$j$, and access point 272-$j$, wherein j has a value equal to one as depicted.

VLR application server 261, a computer system, comprises equipment for storing a database of OTT call service subscribers who have roamed into the serving area defined by hotspot 270-$j$. The data stored in server 261 is either received from HLR 212 or collected from mobile station 231, or both. Server 261 communicates with HLR 212 via a "D" interface, or equivalent, and also communicates with Internet protocol network 262. Server 261, which is further described in FIG. 4, further comprises the hardware and software necessary to perform the related processes described below and in the accompanying figures.

Internet protocol (IP) network 262 is a serves as an alternative routing path (e.g., alternative to cellular network 250, etc.) for at least some of the call services provided within telecommunications system 200, in accordance with the illustrative embodiment of the present invention, described below and in FIG. 3.

Feature server 263, a computer system, comprises equipment for coordinating the OTT call service of the illustrative embodiment. Server 263 further comprises the hardware and software necessary to perform the related processes described below and in the accompanying figures.

In regard to feature server 263, this computer system comprises at least one server computer that performs at least some of the tasks disclosed herein. In some embodiments of the present invention, server 263 comprises at least some of the components as those of VLR application server 261, which are described below and in FIG. 4. As those who are skilled in the art will appreciate after reading this specification, the hardware platform performing at least some of the tasks performed by feature 263 can be embodied as a multi-processor platform, as a sub-component of a larger computing platform, as a virtual computing element, or in some other computing environment—all within the scope of the present invention.

As those who are skilled in the art will appreciate after reading this specification, feature server 263 can be a different type of apparatus than a server computer, and can be referred to by a different name such as a data-processing system, a computer system, a computing device, or another type of hardware platform that comprises one or more processors, one or more memories, and one or more network interfaces, for example and without limitation.

As depicted in FIG. 2, feature server 263, VLR server 261, and IP network 262 constitute communication service provider (CSP) network 260. Communication service provider (CSP) network 260 is a network that transports information electronically. In accordance with the illustrative embodiment of the present invention, CSP network 260 is that of a telecommunications service provider (TSP). Elements 261 through 263 are depicted as all being within network 260; however, as those who are skilled in the art will appreciate after reading this specification, one or more of elements 261 through 263 can be situated outside of network 260. In some embodiments of the present invention, one or both of elements 261 and 263 are implemented in a cloud-based service.

In some embodiments of the present invention, networks 210 and 260 including their respective equipment components are controlled by different business entities, while in some other embodiments the two networks are controlled by the same business entity. In some embodiments of the present invention, networks 250 and 260 including their respective equipment components are controlled by different business entities, while in some other embodiments the two networks are controlled by the same business entity.

Figure 3:
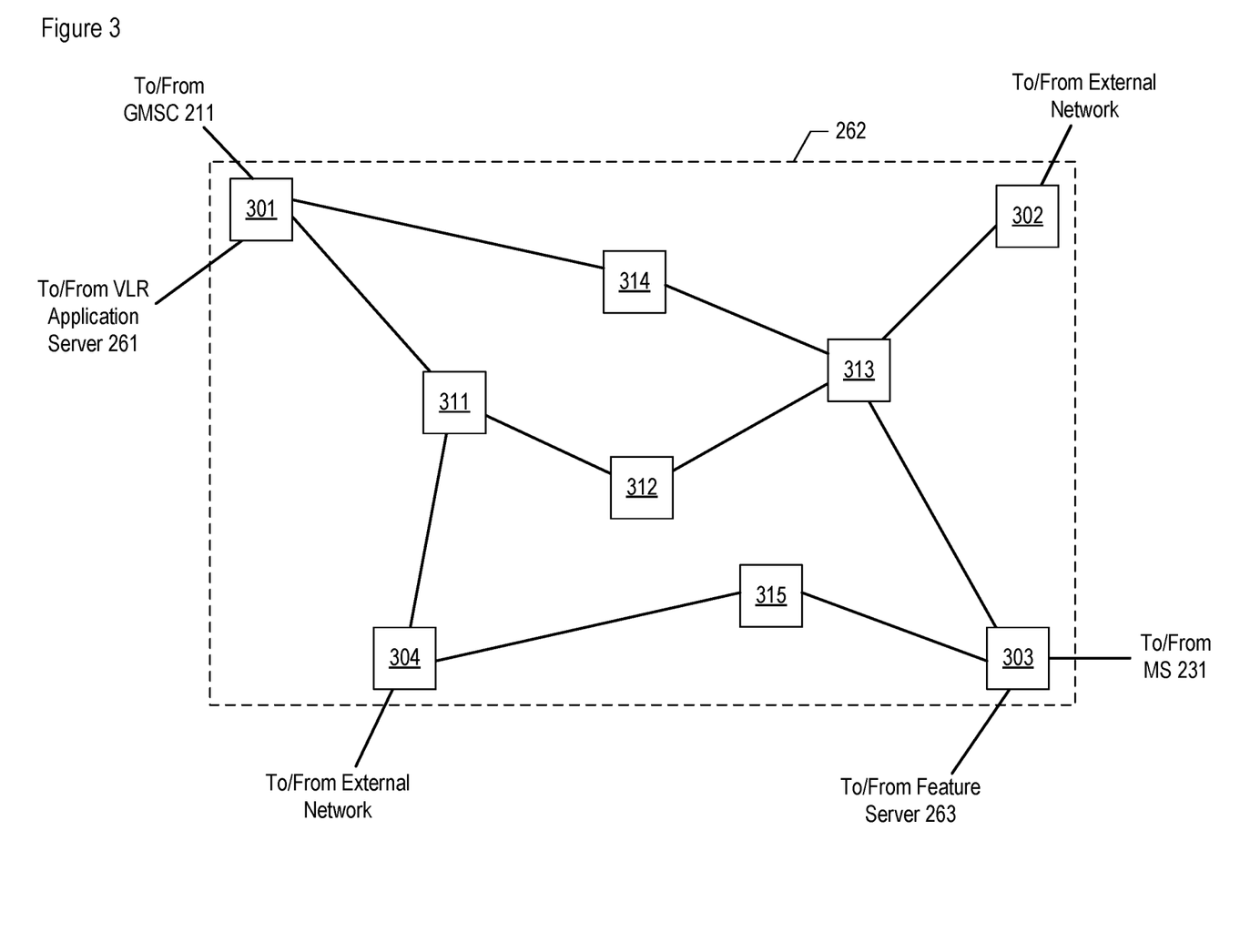
FIG. 3 depicts Internet protocol (IP) network 262 within telecommunications system 200.

FIG. 3 depicts Internet protocol (IP) network 262 within telecommunications system 200. IP network 262 serves as an alternative routing path for at least some of the call services provided within telecommunications system 200, in accordance with the illustrative embodiment of the present invention. IP network 262 comprises computer-networking devices, namely media gateways 301 through 304 and routers 311 through 315. Although four gateways and five routers are depicted, network 262 can comprise any number of gateways, routers, and networking devices in general.

In accordance with the illustrative embodiment, network 262 is a tier 1 IP network. In some alternative embodiments of the present invention, however, network 262 can be a different type of service provider network, such as a tier 2 IP network, for example and without limitation. Furthermore, in some embodiments of the present invention, IP network 262 can also serve as a backbone Internet service provider network as is known in the art and, as such, can be referred to as a "backbone service provider network."

IP network 262 is capable of coordinating quality-of-service- (QoS-) enabled IP service for traffic prioritization between GMSC 211 and wireless access point 272-$j$, in some embodiments of the present invention. As video and voice are latency-sensitive applications, it can be inefficient to give file sharing and email applications the same priority in the delivery. IP network 220 can enable at least a portion of telecommunications system 200 to provide to video, voice, and other latency-sensitive applications higher QoS to improve the network utility.

Wireless access point 272-$j$ communicates with mobile station 231 via WiFi-enabled radio, by providing hotspot 270-$j$, and also communicates with IP Network 262 via router 271-$j$. In accordance with the illustrative embodiment, each wireless access point 272-$j$ has one or more antennas that are associated with the access point, in order to enable communication with mobile station 231. The coverage of hotspot 270-$j$ provided by a wireless access point might or might not overlap with the coverage of location area 240-$i$.

Although the illustrative embodiment comprises one wireless access point, it will be clear to those skilled in the art, after reading this disclosure, how to make and use alternative embodiments of the present invention that comprise any number of wireless access points.

Figure 4:
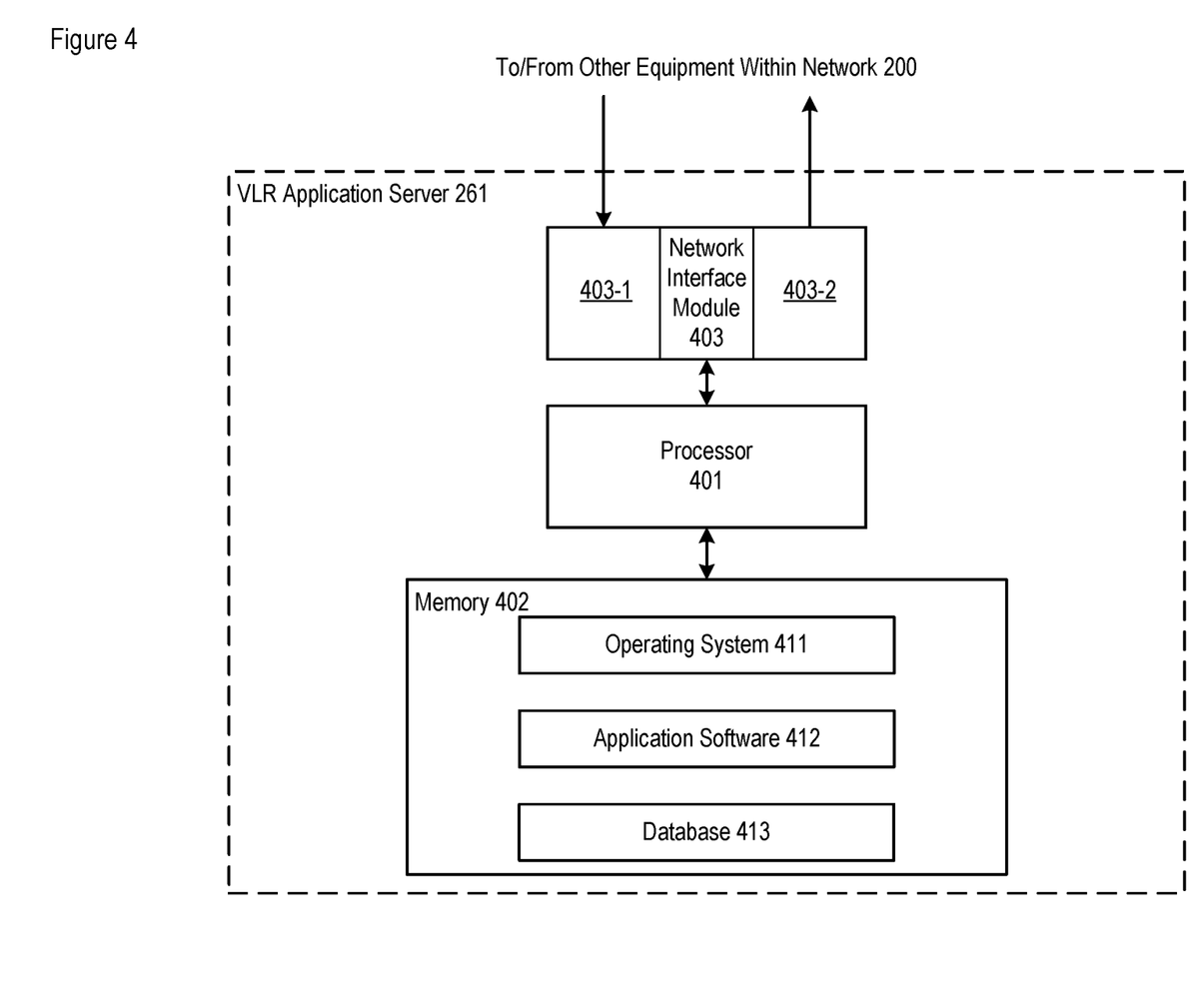
FIG. 4 depicts a block diagram of the salient components of VLR application server 261 within telecommunications system 200.

FIG. 4 depicts a block diagram of the salient components of VLR application server 261, in accordance with the illustrative embodiment of the present invention. Server 261, a server computer, comprises: processor 401, memory 402, and network interface module 403, which are interconnected as shown.

Server 261 comprises at least one server computer that performs at least some of the tasks disclosed herein. As those who are skilled in the art will appreciate after reading this specification, the hardware platform performing at least some of the tasks performed by server 261 can be embodied as a multi-processor platform, as a sub-component of a larger computing platform, as a virtual computing element, or in some other computing environment—all within the scope of the present invention.

As those who are skilled in the art will appreciate after reading this specification, server 261 can be a different type of apparatus than a server computer, and can be referred to by a different name such as a data-processing system, a computer system, a computing device, or another type of hardware platform that comprises one or more processors, one or more memories, and one or more network interfaces, for example and without limitation.

Processor 401 is a general-purpose processor that is configured to execute operating system 411 and application software 412, and to populate, amend, use, and manage database 413, as described in detail below and in the accompanying figures. For the purposes of this specification, a "processor" is defined as one or more computational elements, whether co-located or not and whether networked together or not.

Memory 402 is non-transitory and non-volatile computer storage memory technology that is well known in the art (e.g., flash memory, etc.). Memory 402 is configured to store operating system 411, application software 412, and database 413. The operating system is a collection of software that manages server 261's hardware resources and provides common services for computer programs, such as those that constitute the application software. The application software that is executed by processor 401 enables server 261 to perform at least some of the functions disclosed herein. Database 413 comprises information for different subscribers (e.g., IMSI, MSRN, OTT call service identification, etc.) of the OTT service or services of the illustrative embodiment, their availabilities at any given moment through the OTT service or services (e.g., "available", "not available", etc.), and information about their mobile stations (e.g., MSISDN, etc.).

Memory 402 is a non-transitory computer-readable medium storing a computer program comprising computer-readable instructions that, when loaded and executed on server 261, cause server 261 to perform at least some of the tasks described herein.

It will be clear to those having ordinary skill in the art how to make and use alternative embodiments that comprise more than one memory 402; or comprise subdivided segments of memory 402; or comprise a plurality of memory technologies that collectively store the operating system, application software, and database.

Network interface module 403 comprises a network adapter configured to enable server 261 to transmit information to and receive information from other parts of telecommunications system 200. Module 403 comprises receiver 403-1 configured to receive and transmitter 403-2 configured to transmit.

Figure 5A:
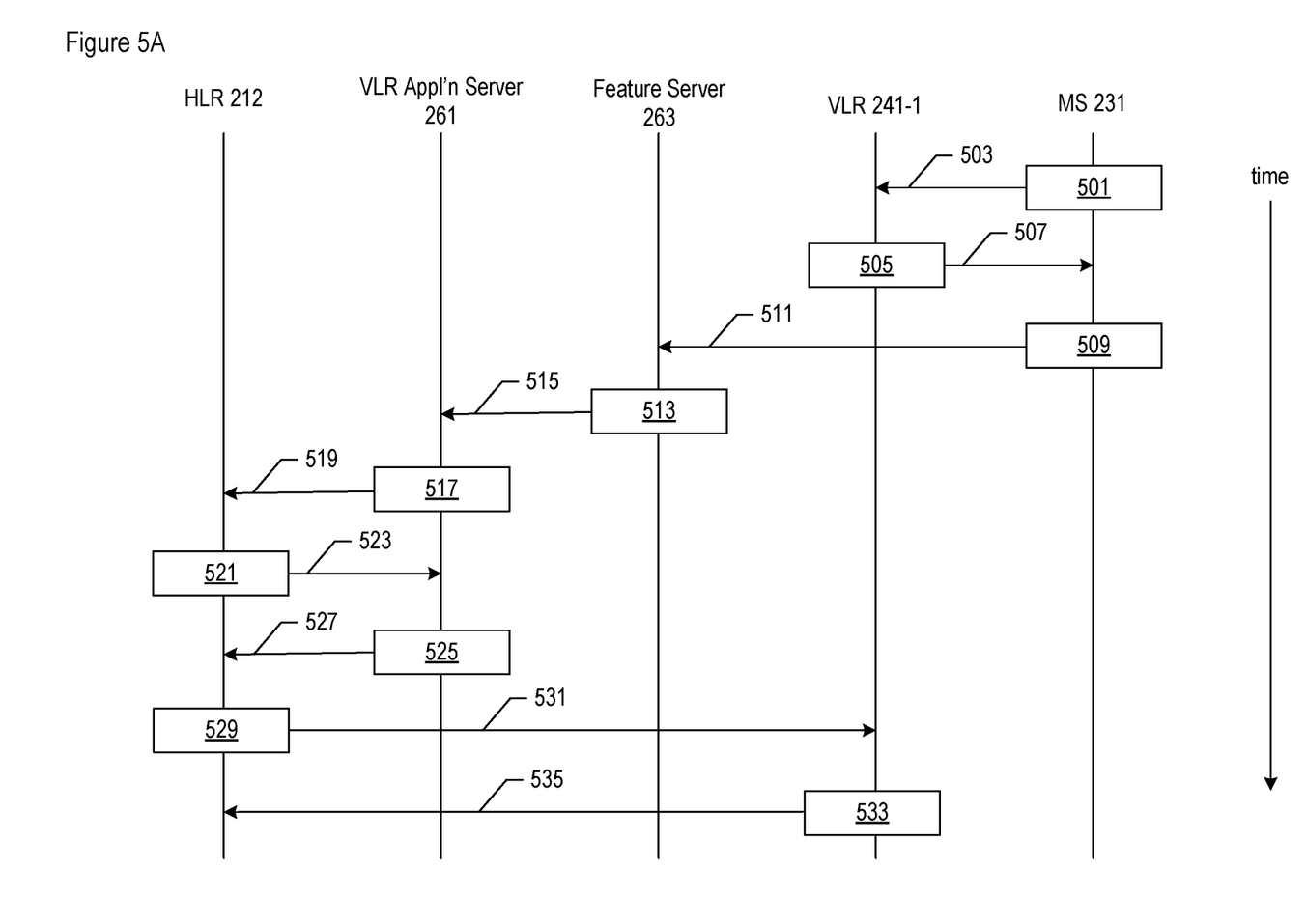
FIGS. 5A and 5B depicts a message flow diagram of the salient processes performed and messages exchanged in accordance with a subscriber registering for a predetermined, over-the-top (OTT) call service of the illustrative embodiment.
Figure 5B:
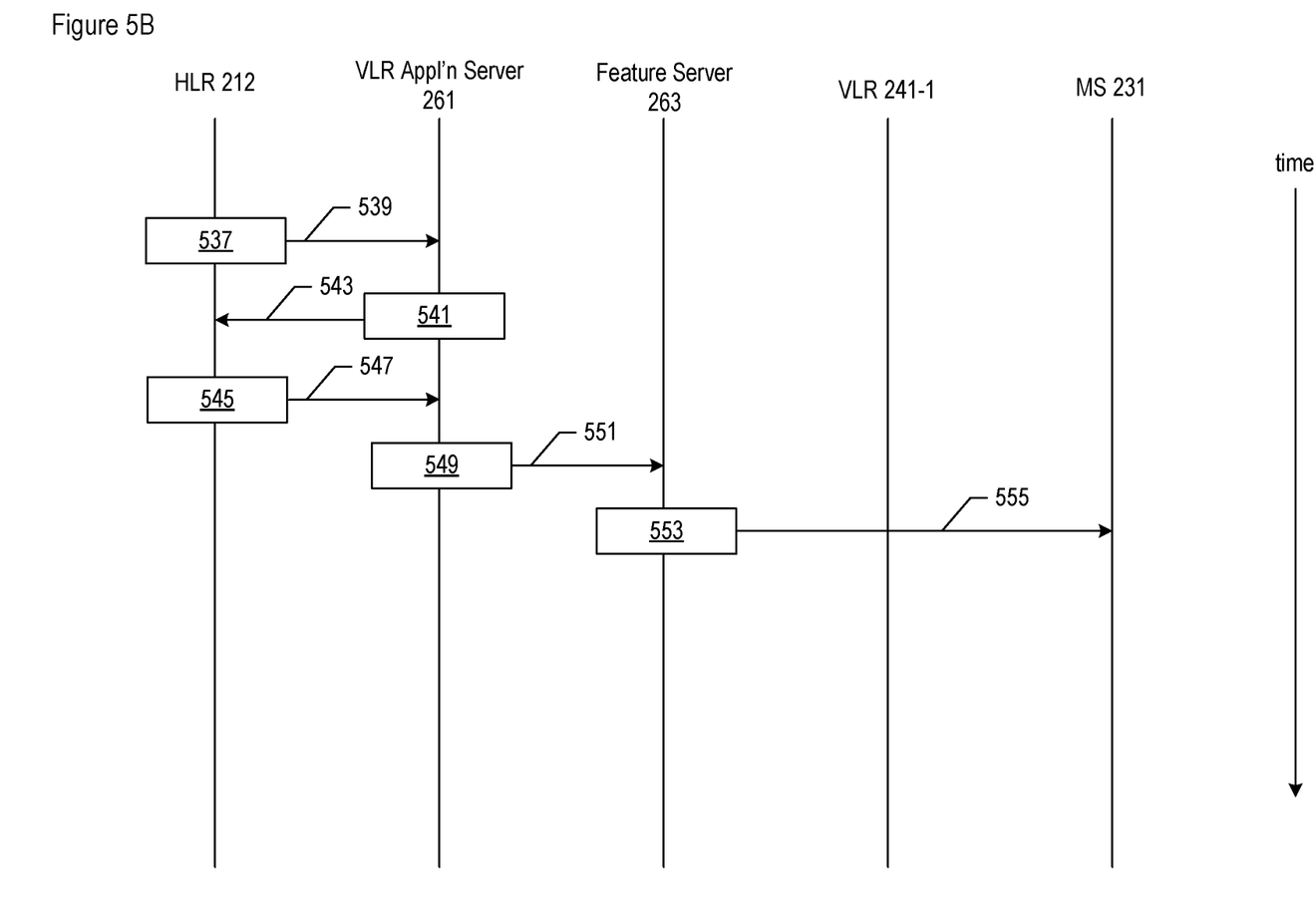
Figure 6A:
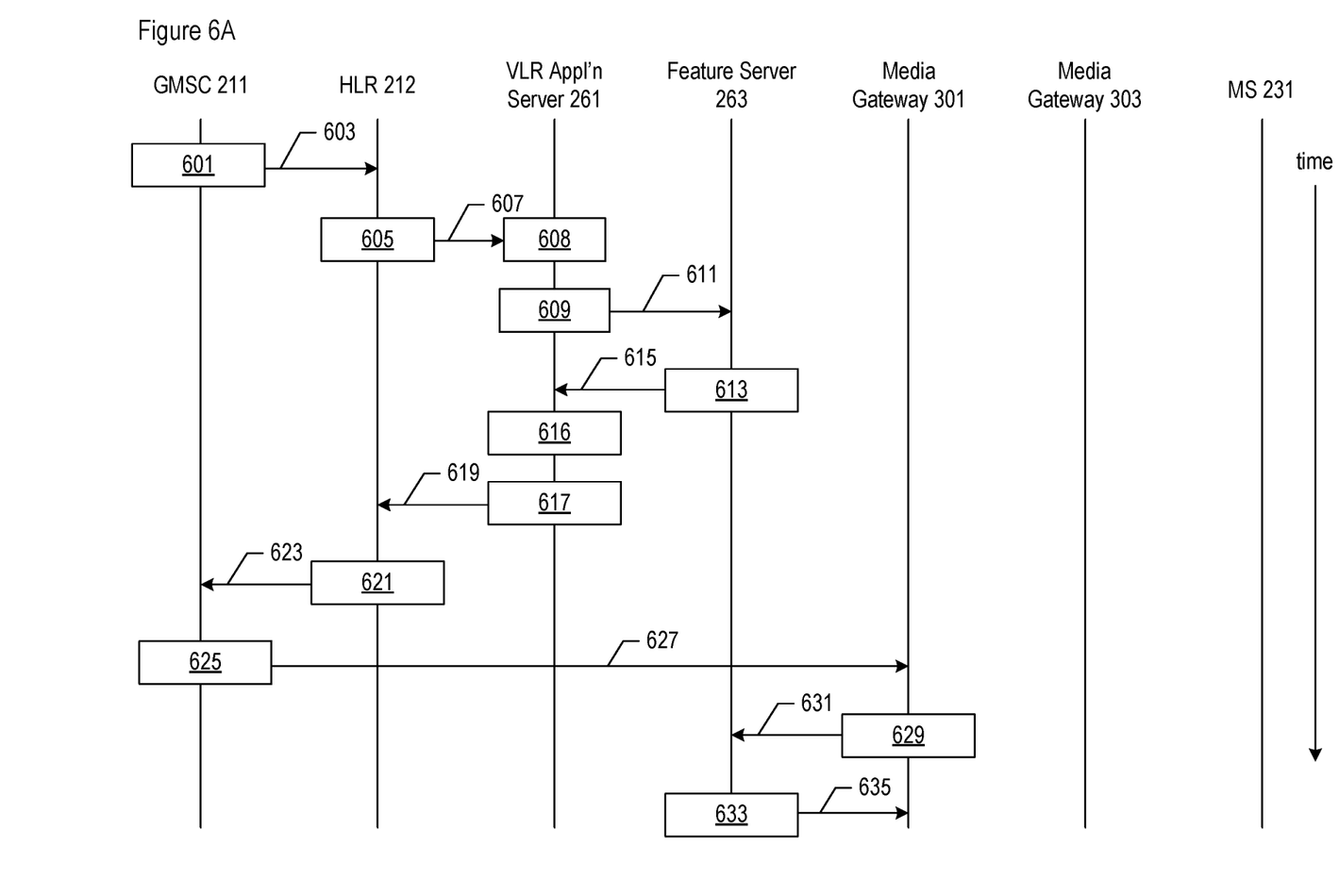
FIGS. 6A and 6B depicts a message flow diagram of the salient processes performed and messages exchanged in accordance with a subscriber, as a called party, receiving an incoming call at mobile station 231 via the OTT call service.
Figure 6B:
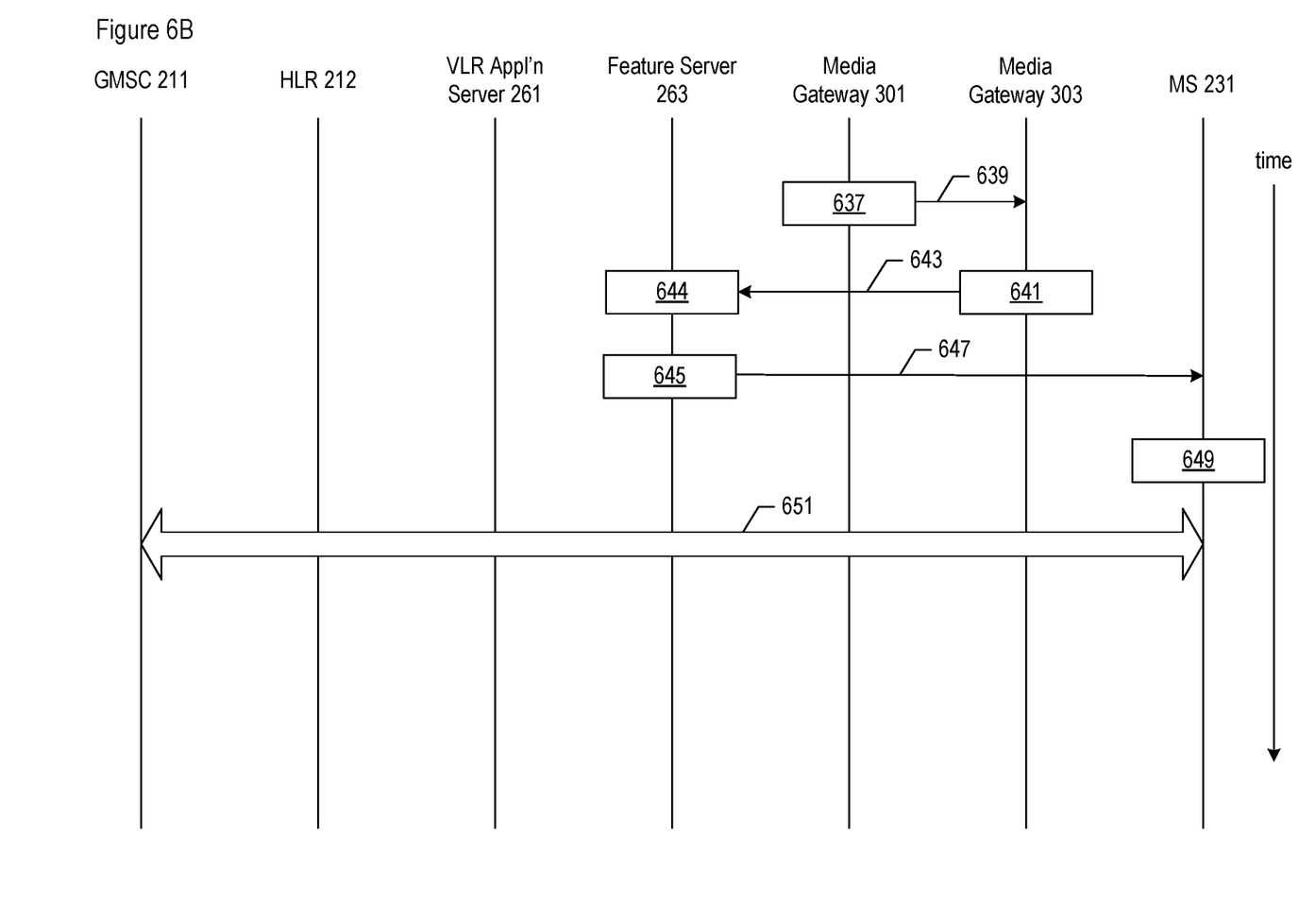
Figure 7:
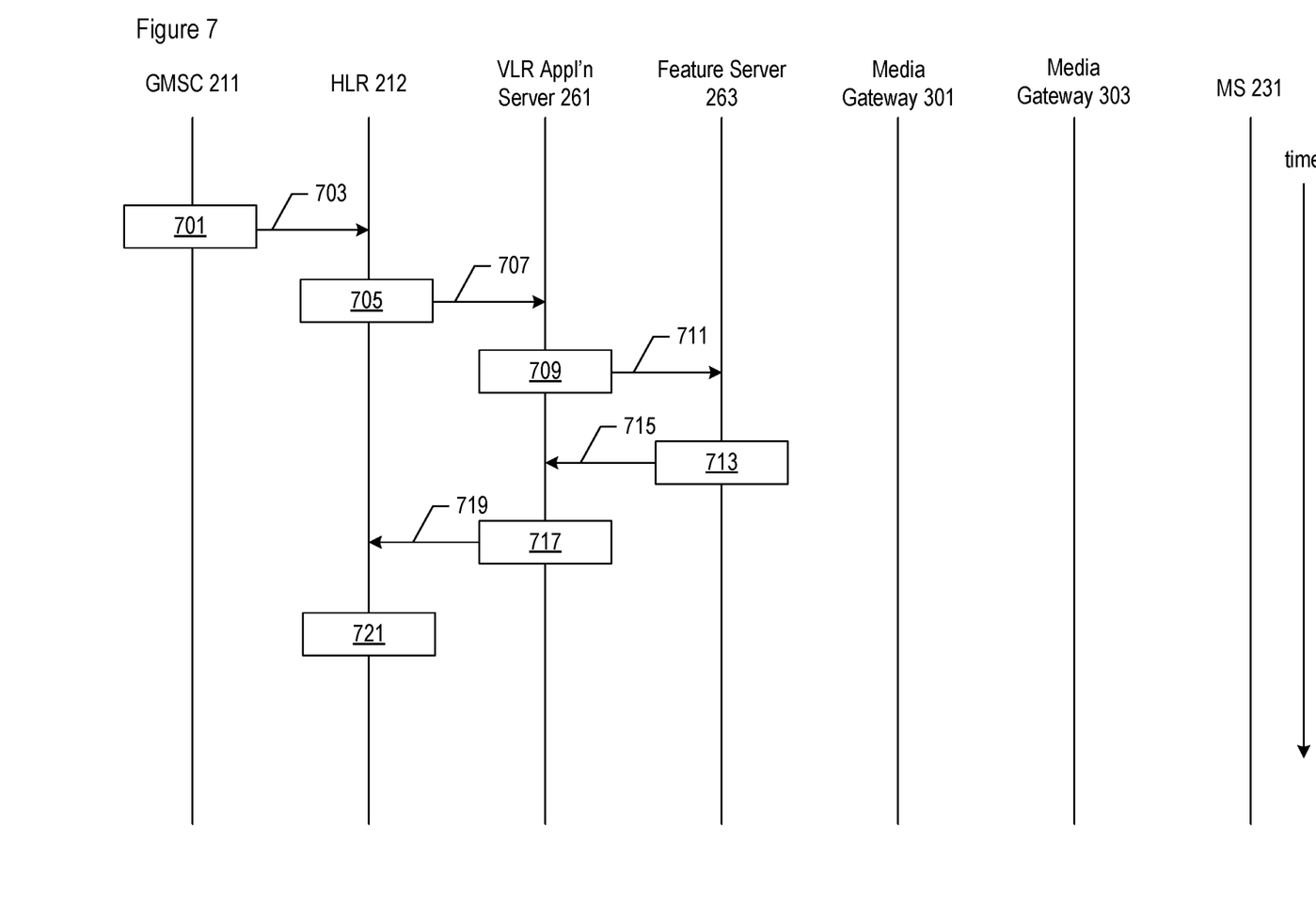
FIG. 7 depicts a message flow diagram of the salient processes performed and messages exchanged in accordance with an unregistered subscriber receiving an incoming call via the OTT call service.

FIGS. 5 through 7 depict message flow diagrams that are representative of various operating scenarios of telecommunications system 200. The processes performed by wireless telecommunications system 200 of the illustrative embodiment are depicted in the drawings (i.e., FIG. 5 and subsequent figures) as being performed in a particular order. It will, however, be clear to those skilled in the art, after reading this disclosure, that these operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

Subscriber Registration—FIGS. 5A and 5B depicts a message flow diagram of the salient processes performed and messages exchanged in accordance with a subscriber registering for a predetermined, over-the-top (OTT) call service of the illustrative embodiment. As an overview, when a subscriber registers, feature server 263 initiates the subscriber's registration with VLR server 261. In turn, VLR server 261 informs HLR 212 that the subscriber is presently roaming and is registered at VLR server 261.

A brief discussion of the types of messages exchanged between HLR 212 and VLR server 261 is provided here. In accordance with the illustrative embodiment, VLR server 261 utilizes standardized messages in order to ensure compatibility with HLR 212. Compatibility with at least HLR 212 is necessary because it is assumed that no hardware or software modifications are possible at HLR 212. The standardized messages used in the illustrative embodiment are described in detail in "Digital cellular telecommunications system (Phase 2+); Mobile Application Part (MAP) specification (GSM 09.02), Version 5.3.0," which is incorporated herein by reference.

As one example of a standardized message utilized, VLR server 261 is configured to transmit a MAP/D UPDATE LOCATION message to HLR 212, having the effect of HLR 212 updating its record to point to server 261 as the new VLR until otherwise notified.

Standardized messages are used in accordance with the illustrative embodiment. However, it will be clear to those skilled in the art, after reading this specification how to make and use alternative embodiments in which one or more alternative messages, standardized or otherwise, are used instead of the standardized messages described below.

Referring to FIG. 5A, at process 501, MS 231 detects a power-on condition, as a result of the subscriber powering-on the mobile station. As a result, MS 231 transmits message 503 to initiate the registration process with the GSM cellular network. The sequence for registering with a GSM network is well known in the art and will not be discussed here.

At process 505, VLR 241-1 transmits message 507 to indicate that the registration process with the GSM network has been completed. At this point, MS 231 is registered with cellular network 250 and is capable of further communication (e.g., receiving and/or transmitting messages, etc.) with network 250 via one or more radio channels within network 250.

At process 509, MS 231 acquires the WiFi network provided by hotspot 270-1. As a result, MS 231 transmits message 511 to feature server 263, in order to register with the OTT call service. In accordance with the illustrative embodiment, the corresponding software application executing on MS 231 initiates the transmitting of message 511 to server 263. In some embodiments of the present invention, MS 231 waits until after receiving message 507 (i.e., until after GSM network registration is completed), while in other embodiments MS 231 transmits message 511 before receiving message 507 (i.e., before GSM network registration is completed).

In accordance with the illustrative embodiment, MS 231 has been provided (e.g., via downloading, etc.) with a software application (i.e., "app") that corresponds to the predetermined OTT call service. It is the app executing at MS 231 that executes process 509, which provides registration of MS 231 with network 260 that is external to and/or independent of cellular network 250.

At process 513, feature server 263 transits message 515 to VLR application server 261 in response to receiving message 511. In accordance with the illustrative embodiment, message 515 is in the form of an HTTPS (SUB_REG) request containing the subscriber's telephone number, the dialed number (i.e., the MSISDN). In some embodiments, exchanges between servers 261 and 263 can be implemented in accordance with the Session Initiation Protocol (SIP).

At process 517, VLR server 261 transmits message 519 to HLR 212 in response to receiving message 515 and after checking that the subscriber is not already registered with server 261. In accordance with the illustrative embodiment, message 519 is in the form of a SEND IMSI REQUEST message containing the telephone number (i.e., the MSISDN) of the subscriber.

At process 521, HLR 212 transmits message 523 to VLR server 261 in response to receiving message 519. Message 523 contains the IMSI of the subscriber.

At process 525, VLR server 261 transmits message 527 to HLR 212 in response to receiving the IMSI of the subscriber. In accordance with the illustrative embodiment, message 527 is in the form of a MAP/ANY TIME INTERROGATION (ATI) REQUEST message. In some alternative embodiments, this and/or possibly other messages described below can be exchanged between VLR application server 261 and VLR 241-1 directly, instead of involving HLR 212.

At process 529, HLR 212 transmits message 531 to VLR 241-1—that is, the VLR in the GSM network at which the subscriber is currently registered—in response to receiving message 527. In accordance with the illustrative embodiment, message 531 is in the form of a MAP/PROVIDE SUBSCRIBER INFO REQUEST message.

At process 533, VLR 241-1 transmits message 535 to HLR 212 in response to receiving message 531. In accordance with the illustrative embodiment, message 535 is in the form of a MAP/PROVIDE SUBSCRIBER INFO RESPONSE message.

Continuing in FIG. 5B, HLR 212 at process 537 transmits message 539 to VLR server 261 in response to receiving message 535, thereby returning the current GSM network VLR information. In accordance with the illustrative embodiment, message 539 is in the form of a MAP/ANY TIME INTERROGATION (ATI) RESPONSE message.

VLR server 261 stores the current GSM network VLR information for later use. For example, if and when MS 231 later on is no longer being served by hotspot 270-1 (e.g., moves out of the hotspot, etc.), VLR server 261 can send a MAP/PRN message to VLR 241-1 using the subscriber's last known VLR information obtained by the ATI message sequence. Advantageously, this avoids MS 231 being in limbo with regard to HLR 212 and future incoming calls.

At process 541, VLR server 261 transmits message 543 to HLR 212 in response to receiving message 539, thereby providing the OTT call service's VLR information. In accordance with the illustrative embodiment, message 543 is in the form of a MAP/UPDATE LOCATION message.

In some embodiments of the present invention, a GSM UPDATE PARAMETERS sequence, or equivalent, can also be performed here involving VLR 241-1.

At process 545, HLR 212 transmits acknowledgment message 547 to VLR server 261 in response to receiving message 543.

At process 549, VLR server 261 transmits message 551 to feature server 263 in response to a successful registration of the subscriber.

At process 553, feature server 261 transmits message 555 to MS 231 in response to a successful registration of the subscriber.

Incoming Call to Subscriber—FIGS. 6A and 6B depicts a message flow diagram of the salient processes performed and messages exchanged in accordance with a subscriber, as a called party, receiving an incoming call at mobile station 231 via the OTT call service. As an overview, while the subscriber is registered with VLR server 261 and the feature server 263, all incoming call requests to the subscriber's telephone number (i.e., the MSISDN) is forwarded to the servers 261 and 263 for processing. Furthermore, given that the subscriber is in a visiting location, an appropriate local number is provided to HLR 212 to forward the call to. Advantageously, this can result in a least-cost route for the call. It is important to note that while these actions are taking place within networks 210 and 260, MS 231 can also be capable (i.e., can concurrently maintain its capability) of communication via a radio channel within cellular network 250.

For pedagogical purposes, VLR server 261 is sometimes referred to in this specification as a "first computer system", HLR 212 is sometimes referred to as a "second computer system", and feature server 263 is sometimes referred to as a "third computer system".

Referring to FIG. 6A, at process 601, GMSC 211 detects an incoming call being received from telephone 221, an originating endpoint of a calling party. As a result, GSMC 211 transmits message 603 to HLR 212, indicating the incoming call information.

At process 605, HLR 212 transmits message 607 to VLR server 261 in response to receiving message 603. In accordance with the illustrative embodiment, message 607 is in the form of a MAP/PROVIDE ROAMING NUMBER REQUEST message. Server 261 receives the message at process 608.

At process 609, VLR server 261 transmits message 611 to feature server 263 in response to receiving message 607, in order to determine whether the subscriber is still registered with server 263. More generally, server 261 is determining what the availability of the called party is through the over-the-top (OTT) call service of the illustrative embodiment, wherein feature server 263 coordinates the OTT call service.

At process 613, if the subscriber is still registered, feature server 263 transmits message 615 to VLR server 261. (FIG. 7 depicts a message flow for the scenario in which the subscriber is not registered.)

At process 616, VLR server 261 determines a roaming number based on a geographic location of MS 231 and/or other business logic, in the process retrieving an MSRN appropriate for routing towards MS 231, in response to receiving message 615. In at least some embodiments of the present invention, the roaming number corresponds to a point (e.g., spot, place, position, etc.) that is external to cellular network 250, and in determining the roaming number server 261 does not use cellular network 250 as a frame of reference. In some embodiments of the present invention, a roaming number that corresponds to a point that is external to network 250 can be one that is selected from an address space that is outside of the address space of network 250, wherein the point itself can be based on the geographic location of MS 231. The geographic location of MS 231 used in determining the roaming number is independent of cellular network 250.

In accordance with the illustrative embodiment, server 261 uses an IP-based geolocation, which is an IP address location, in order to determine the closest equipment component (e.g., a gateway, etc.) to MS 231, within network 260 and retrieves the roaming number (i.e., the MSRN) corresponding to that equipment component. In some embodiments, this can be obtained via GeoIP™, or other suitable system. In some embodiments of the present invention, the geolocation of MS 231 is based on an IP address assigned to the mobile station by the OTT call service being coordinated by feature server 263.

At process 617, server 261 then transmits to HLR 212 message 619 containing the retrieved MSRN as the roaming number. In accordance with the illustrative embodiment, message 619 is in the form of a MAP/PROVIDE ROAMING NUMBER RESPONSE message.

At process 621, HLR 212 transmits message 623 to GMSC 211, thereby forwarding the MSRN.

At process 625, GMSC 211 transmits message 627 to media gateway 301 within IP network 262, thereby forwarding information for the incoming call. In some embodiments, GMSC 211 uses the received MSRN to determine whether to route the call to IP network 262 (e.g., via dedicated lines such as SIP or TDM trunks), in contrast to another network such as cellular network 250. For example and without limitation, GMSC 211 might have pre-stored one or more MSRNs that correspond to locations within IP network 262; upon receiving an MSRN with a value matching that of a pre-stored MSRN, GMSC 211 routes the call to IP network 262, which then further resolves how to use MSRN, as described below.

At process 629, upon receiving the incoming call, media gateway 301, which is at the ingress point from GMSC 211 and within IP network 262, queries routing logic (e.g., via an intermediary computer system, etc.) via message 631 to determine the route the call will take to an egress point.

At process 633, feature server 263 determines the egress point within IP network 262. Server 263 does so by determining the geolocation of MS 231 corresponding to the roaming number (i.e., the MSRN). As explained earlier, this can be accomplished by retrieving the IP geolocation information to identify the region of the world that MS 231 with respect to IP network 262. In accordance with the illustrative embodiment, server 263 selects the computer-networking device within IP network 262 based on proximity to MS 231 (e.g., the gateway closest geographically to MS 231), in this case device 303. As those who are skilled in the art will appreciate after reading this specification, however, a different criterion can be used to select the media gateway, either based on the MSRN or independent of the MSRN.

Feature server 263 then transmits message 635, thus providing the identity of the egress point to device 301.

At process 637, media gateway 301 routes that call by forwarding the incoming call information via message 639 and across possible intermediate switching devices, to the media gateway corresponding to the MSRN, namely media gateway 303 within IP network 262. A service provider different than that of cellular network 250 controls the computer-networking devices within IP network 262 and through which the call is routed.

At process 641, media gateway 303 forwards the incoming call information to feature server 263 via message 643, in order to notify MS 231 of the incoming call. For example and without limitation, this can be accomplished via Session Initiation Protocol (SIP) as can be at least some of the other call signaling tasks. Server 263 receives the information at process 644. In some embodiments, a Session Border Control (SBC) is used in addition to or in place of feature server 263, in order to exchange messages between IP network 262 and MS 231.

At process 645, server 263 forwards the incoming call information to MS 231 via message 647, which rings the subscriber at process 649.

Once the subscriber answers at MS 231 and the setup of the call is completed, the data packets of the call are transferred between GMSC 211 at the telephone 221 side of the call and MS 231, as depicted by data stream 651.

Incoming Call to Subscriber Not Registered—FIG. 7 depicts a message flow diagram of the salient processes performed and messages exchanged in accordance with an unregistered subscriber receiving an incoming call via the OTT call service.

At process 701, and similar to process 601 in FIG. 6A, GMSC 211 detects an incoming call being received from telephone 221. As a result, GSMC 211 transmits message 703 to HLR 212, indicating the incoming call information.

At process 705, HLR 212 transmits message 707 to VLR server 261 in response to receiving message 703. In accordance with the illustrative embodiment, message 707 is in the form of a MAP/PROVIDE ROAMING NUMBER REQUEST message.

At process 709, VLR server 261 transmits message 711 to feature server 263 in response to receiving message 707, in order to determine whether the subscriber is still registered with server 263.

At process 713, if the subscriber is not still registered, feature server 263 transmits message 715 to VLR server 261.

At process 717, VLR server 261 transmits message 719 to HLR 212, with an "absent subscriber" error code.

At process 721, HLR 212 disposes of the incoming call accordingly, in response to receiving the error code.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system for setting up a call from an originating endpoint of a calling party to a mobile station of a called party, the system comprising:
  a first computer system, the first computer system comprising:
    a receiver that is configured to receive, from a second computer system, a request for a roaming number and a dialed number for the call when placed by the calling party, wherein the dialed number corresponds to the mobile station and a cellular network with which the mobile station is registered as a roamer;
    a processor that is configured to determine, in response to the request for the roaming number, an availability of the called party through a predetermined over-the-top (OTT) call service, and the roaming number based on the availability of the called party; and
    a transmitter that is configured to:
      transmit, to a third computer system configured to coordinate the predetermined OTT call service, a request about the availability of the called party through the predetermined OTT call service; and
      transmit, to the second computer system, the roaming number based on the determined availability of the called party;
  wherein, in response to the request about the availability of the called party through the predetermined OTT call service, the third computer system transmits a message to the first computer system, which indicates that the called party is available through the predetermined OTT call service; and
  wherein the roaming number determined by the processor and transmitted by the transmitter is based on a geographic location of the mobile station, wherein the roaming number corresponds to a point that is external to the cellular network with which the mobile station is registered as the roamer; and
  wherein, based on the roaming number, the second computer system routes the call through a path that bypasses the cellular network with which the mobile station is registered as the roamer.

2. The system of claim 1 further comprising a first computer-networking device that is configured to route the call to a second computer-networking device based on the roaming number,
  wherein both the first and second computer-networking devices are external to the cellular network.

3. The system of claim 2 wherein the third computer system that is further configured to:
receive a first signal based on the call being routed to the second computer-networking device, and
transmit, to the mobile station, a second signal for notifying the called party of the call, based on the first signal.

4. The system of claim 2 wherein the second computer-networking device is selected based on the determining of the geographic location of the mobile station, and
wherein the roaming number corresponds to the second computer-networking device.

5. The system of claim 4 wherein the second computer-networking device is selected based on its geographical proximity to the mobile station.

6. The system of claim 1 wherein the processor of the first computer system is configured to determine the roaming number based on determining the geographic location of the mobile station based on an Internet protocol address assigned to the mobile station by the predetermined OTT call service.

7. The system of claim 1 wherein the second computer system comprises a Home Location Register (HLR) database.

8. The system of claim 1 wherein the roaming number is a mobile subscriber roaming number (MSRN).

9. The system of claim 1 wherein a first mobile network operator (MNO) that controls the second computer system and a second MNO that controls the cellular network are different.

10. A method for setting up a call from an originating endpoint of a calling party to a mobile station of a called party, the method comprising:
receiving, by a first computer system from a second computer system, a request for a roaming number and a dialed number for the call when placed by the calling party, wherein the dialed number corresponds to the mobile station and a cellular network with which the mobile station is registered as a roamer;
determining, by the first computer system, in response to the request for the roaming number, an availability of the called party through a predetermined over-the-top (OTT) call service, and the roaming number based on the availability of the called party;
transmitting, by the first computer system to a third computer system configured to coordinate the predetermined OTT call service, a request about the availability of the called party through the predetermined OTT call service;
in response to the request about the availability of the called party through the predetermined OTT call service, transmitting, by the third computer system, a message to the first computer system, which indicates that the called party is available through the predetermined OTT call service;
in response to the message from the third computer system that indicates that the called party is available through the predetermined OTT call service, transmitting, by the first computer system to the second computer system, the roaming number determined by the first computer system, the roaming number based on a geographic location of the mobile station and the roaming number corresponding to a point that is external to the cellular network with which the mobile station is registered as the roamer; and
based on the roaming number, routing, by the second computer system, the call through a path that bypasses the cellular network with which the mobile station is registered as the roamer.

11. The method of claim 10 further comprising routing the call, from a first computer-networking device to a second computer-networking device, based on the roaming number, wherein both the first and second computer-networking devices are external to the cellular network.

12. The method of claim 11 further comprising:
receiving, by the third computer system, a first signal based on the call being routed to the second computer-networking device; and
transmitting, by the third computer system to the mobile station, a second signal for notifying the called party of the call, based on the first signal.

13. The method of claim 11 further comprising selecting the second computer-networking device based on the determining of the geolocation of the mobile station, wherein the roaming number corresponds to the second computer-networking device.

14. The method of claim 13 wherein the second computer-networking device is selected based on its geographical proximity to the mobile station.

15. The method of claim 10 wherein the determining of the roaming number comprises determining the geolocation of the mobile station based on an Internet protocol (IP) address assigned to the mobile station by the predetermined over-the-top OTT call service.

16. The method of claim 10 wherein the second computer system comprises a Home Location Register (HLR) database.

17. The method of claim 10 wherein the roaming number is a mobile subscriber roaming number (MSRN).

18. The method of claim 10 wherein a first mobile network operator (MNO) that controls the second computer system and a second MNO that controls the cellular network are different.

19. A non-transitory computer-readable medium storing a computer program comprising computer-readable instructions that, when loaded and executed on a computer system, cause the computer system to perform the steps of a method according to claim 10.

* * * * *